US012678818B2

(12) United States Patent
Giarrizzo, Jr. et al.

(10) Patent No.: US 12,678,818 B2
(45) **Date of Patent: *Jul. 14, 2026**

(54) VEHICLE COLLISION REPAIR BOOTH

(71) Applicant: DCR IP Company, LLC, Mentor, OH (US)

(72) Inventors: Michael Giarrizzo, Jr., Chagrin Falls, OH (US); Douglas Kirk, Lundin Links (GB)

(73) Assignee: DCR IP Company, LLC, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,157

(22) Filed: Sep. 7, 2018

(65) Prior Publication Data

US 2019/0001365 A1 Jan. 3, 2019

Related U.S. Application Data

(63) Continuation of application No. 12/711,645, filed on Feb. 24, 2010, now Pat. No. 10,150,135.

(Continued)

(51) Int. Cl.

*B05B 16/60* (2018.01)
*B05B 16/20* (2018.01)

(Continued)

(52) U.S. Cl.

CPC .............. *B05B 16/60* (2018.02); *B05B 16/20* (2018.02); *B05B 14/30* (2018.02); *B24C 3/065* (2013.01); *F24F 2007/001* (2013.01)

(58) Field of Classification Search

CPC ........... B24C 9/00; B24C 3/062; B24C 3/064; B05B 13/02; B05B 13/027; B05B 14/30; B05B 16/20; F24F 2007/001

(Continued)

(56) References Cited

U.S. PATENT DOCUMENTS 1,964,920 A * 7/1934 Ladrie ................ B23Q 11/0017 451/451
1,977,386 A * 10/1934 Holes ........................ B24C 9/00 451/75

(Continued)

FOREIGN PATENT DOCUMENTS

GB 2049164 A * 12/1980 ............. B08B 15/00
GB 2053037 A * 2/1981 ........... B05B 13/005

(Continued)

OTHER PUBLICATIONS

International Search Report for PCT Application No. PCT/US2010/000538, mailed Nov. 10, 2010.

(Continued)

*Primary Examiner* — Michael G Hoang
*Assistant Examiner* — Frances F. Hamilton
(74) *Attorney, Agent, or Firm* — Curatolo Sidoti & Trillis Co., LPA; Salvatore A. Sidoti; Floyd Trillis, III

(57) ABSTRACT

Provided is a booth that includes a booth housing that defines an area for locating or positioning a vehicle to undergo a filling, priming, and/or painting operation as part of an overall vehicle collision damage repair process. The booth includes a first air handling system and a second air handling system that is in fluid communication with a tool. The first handling system includes an air intake, a plenum, a filter to filter air from the air plenum before that enters into the interior of the housing, and an air exhaust. The second air handling system includes flexible and static conduits that are in communication with each other and in communication with an air exhaust outlet for removing debris and particulate from the booth. A tool is carried by a carriage and support that permits movement of the tooling throughout the paint spray booth and is in fluid communication with the second air handling system.

7 Claims, 2 Drawing Sheets

Related U.S. Application Data

(60) Provisional application No. 61/154,939, filed on Feb. 24, 2009.

(51) Int. Cl.
*F24F 7/00* (2021.01)
*B05B 14/30* (2018.01)
*B24C 3/06* (2006.01)

(58) Field of Classification Search
USPC .......................................... 454/51, 63, 64, 65
See application file for complete search history.

(56) References Cited

U.S. PATENT DOCUMENTS 2,014,962 A * 9/1935 Bramsen ................. B05B 16/60 454/51
2,693,749 A * 11/1954 Houdek ............... B22D 45/005 454/64
2,829,582 A * 4/1958 Abbott .................... B05B 16/80 454/64
3,096,933 A 7/1963 Bora
3,913,470 A * 10/1975 Cullen .................... F24F 13/02 454/64
3,926,104 A * 12/1975 El Dorado .............. B08B 15/02 55/385.2
4,086,847 A * 5/1978 Overmyer ............. B08B 15/005 454/64
4,117,773 A * 10/1978 Johnson .................. B66C 13/54 137/580
4,156,367 A * 5/1979 Pardo ...................... B25J 9/026 212/319
4,173,176 A * 11/1979 Svensson ............ F24F 13/0209 454/64
4,177,975 A * 12/1979 Meyers ..................... C21C 5/40 266/158
4,233,118 A * 11/1980 Riecker ................. C10B 33/003 105/157.1
4,237,780 A 12/1980 Truhan
4,318,337 A * 3/1982 Wichmann ............ B08B 15/002 454/65
4,375,740 A * 3/1983 Brown .................... B24C 3/065 451/88
4,411,675 A * 10/1983 de Castella ............ B01D 46/10 454/67
4,416,068 A * 11/1983 Nilsson ................ B05D 3/0263 34/267
4,515,072 A 5/1985 Crisp
4,660,465 A * 4/1987 Jentzsch ................. F16L 41/18 104/52
4,714,010 A * 12/1987 Smart ..................... B08B 15/02 454/64
4,781,517 A * 11/1988 Pearce ..................... B25J 18/02 104/167
4,850,382 A * 7/1989 Williams ............ B05B 13/0431 134/167 R
4,852,361 A 8/1989 Oike
4,926,746 A * 5/1990 Smith ..................... B05B 16/60 454/51
4,998,442 A * 3/1991 Brown ..................... B25J 9/026 74/462
5,036,754 A * 8/1991 Simms .................... B08B 15/02 454/65
5,067,285 A * 11/1991 Hilbrands ............ B25J 19/0075 118/DIG. 7
5,085,133 A * 2/1992 Hickling ............... B08B 15/002 454/62
5,133,689 A * 7/1992 Aalto ...................... B08B 15/04 454/67
5,133,691 A * 7/1992 Karlsson ................. B08B 15/02 454/56
5,263,897 A 11/1993 Kondo et al.
5,336,130 A * 8/1994 Ray ....................... B08B 15/002 454/65
5,375,413 A 12/1994 Fredell et al.
5,395,285 A 3/1995 Milton
5,398,910 A 3/1995 Kitazawa
5,456,631 A * 10/1995 Janes ...................... B08B 15/02 454/65
5,487,766 A 1/1996 Vannier
5,527,217 A * 6/1996 Engstrom ............... F16L 3/015 454/65
5,560,583 A * 10/1996 Holmgren ............. B08B 15/002 248/81
5,643,077 A 7/1997 Ayer
5,716,267 A * 2/1998 Hambleton ........... B08B 15/023 454/67
5,749,779 A * 5/1998 Wilburn .................. B05B 16/60 454/67
5,882,404 A 3/1999 Gummer
5,922,399 A 7/1999 Kobayashi
6,139,422 A * 10/2000 Blaschke .............. B08B 15/002 454/166
6,264,547 B1 * 7/2001 Walti ...................... B05B 16/60 454/52
6,273,154 B1 * 8/2001 Laug ....................... B05B 13/04 451/87
6,361,427 B1 3/2002 Sjoberg
6,383,242 B1 * 5/2002 Rogers ................... B01D 46/42 52/63
6,968,633 B2 * 11/2005 Morrison ............. F26B 21/003 34/218
7,104,338 B1 9/2006 McFarland et al.
7,360,534 B2 * 4/2008 Krupp ..................... B05B 16/60 126/110 A
7,685,943 B2 * 3/2010 Caro ....................... F01N 13/08 104/52
7,997,963 B2 8/2011 Ainsworth et al.
8,943,999 B2 * 2/2015 Giarrizzo, Jr. .......... B05B 16/20 118/326
9,643,203 B2 * 5/2017 Williams ................ B05B 16/60
10,150,135 B2 * 12/2018 Giarrizzo, Jr. .......... B05B 14/30
2002/0077057 A1 * 6/2002 Frink ...................... B08B 15/00 454/63
2002/0096319 A1 * 7/2002 Valachovic .............. F24F 11/80 165/263
2002/0158209 A1 10/2002 Ueno
2005/0229921 A1 * 10/2005 Krupp ..................... B05B 16/60 126/298
2006/0286917 A1 * 12/2006 Dionne ................... B05B 16/60 454/53
2007/0092657 A1 * 4/2007 Ferguson ................ B05B 16/60 427/372.2
2007/0131714 A1 * 6/2007 Jutras ...................... B05B 9/007 222/135
2008/0184991 A1 * 8/2008 Krupp ..................... B05B 16/60 126/99 R
2009/0283490 A1 * 11/2009 Givens ................... B25J 9/1065 212/317
2010/0203261 A1 * 8/2010 Kirk ........................ B05B 15/80 427/559
2011/0041757 A1 * 2/2011 Giarrizzo, Jr. .......... B05B 16/95 118/500

FOREIGN PATENT DOCUMENTS

GB 2230486 A * 10/1990 ............. B24C 3/062
GB 2424064 A * 9/2006 ............. B05B 12/18
JP 09-075802 A 3/1997
JP 2001-047980 A 2/2001
JP 2004-344816 12/2004
KR 20070104280 A * 10/2007

OTHER PUBLICATIONS

International Written Opinion for PCT Application No. PCT/US2010/000538, mailed Nov. 10, 2010.

(56) References Cited

OTHER PUBLICATIONS

Office Action in U.S. Appl. No. 12/711,645, mailed Oct. 6, 2014.
Office Action in U.S. Appl. No. 12/711,645, mailed Apr. 9, 2015.
Office Action in U.S. Appl. No. 12/711,645, mailed Aug. 29, 2013.
Office Action in U.S. Appl. No. 12/711,645, mailed Jan. 31, 2013.

* cited by examiner

VEHICLE COLLISION REPAIR BOOTH

CROSS REFERENCE TO RELATED APPLICATIONS

The present application is a continuation of co-pending U.S. Ser. No. 12/711,645, filed Feb. 24, 2010, which claims the benefit of the filing date under 35 U.S.C. 119(e) from U.S. Provisional Application For Patent Ser. No. 61/154,939, filed Feb. 24, 2009, which are incorporated herein by reference in their entireties.

TECHNICAL FIELD

The disclosed subject matter relates to a booth for performing one or more vehicle collision repair operations on a vehicle. The disclosed subject matter more particularly relates to a booth for filling, priming, and/or spray painting a vehicle during the vehicle collision repair process and for removing particulates from the application area and other areas within the booth.

BACKGROUND

Painting in production environments, whether for manufacture of original equipment or output of remediated equipment, is commonly performed within a paint spray booth. In a paint spray booth, the target object to be painted is sprayed with paint by spray painting equipment.

During operation of a paint spray booth, it is common to provide air handling to the booth. The circulating air aids in the removal of paint overspray and volatile gases from the booth. Air handling is commonly performed using fans or blowers. Fans can be used to create air handling by input of air or by extraction of exhaust.

Exhaust from the paint booth is normally treated to remove particulate contaminants. Treatment to remove contaminants may comprise filtration. The exhaust air from the paint spray booth may be passed through a filter to capture some of the particulate material which the handling air removed from the paint spray booth.

It is common in certain remedial work environments to mask surfaces or regions of the object to be painted to prevent paint from covering the masked surfaces or regions. It is also common in certain remedial work environments to apply primers or fillers to the object prior to painting. Often primers and fillers applied to work object require operations subsequent to their application which generate dust, particles, or other debris. Subsequent debris generating operations may include, but are not limited to, sanding, polishing, grinding, or other mechanical finishing operations.

During the repair of vehicles having body collision damage, it is often required to perform filling, priming and painting operations on the body of the damaged vehicle. The debris and particulate from the filling, priming, and painting operations of a vehicle collision repair process must be removed from the booth in an efficient and environmentally compliant manner.

SUMMARY

Provided is a booth for performing a filling, priming, or spraying operation on an object, such as a vehicle undergoing collision damage repair, the booth comprising a housing, a first air handling system for removing debris and particulate from the housing, and second air handling system for removing debris and particulate from a sealed application area located adjacent the object.

According to certain illustrative embodiments, the booth comprises a housing comprising a ceiling and at least one wall defining an area for filling, priming, and/or spraying an object, such as a vehicle undergoing collision damage repair, a first air handling system for removing debris and particulate from the housing, and second air handling system for removing debris and particulate from a sealed application area located adjacent the object.

Also provided is a booth for performing a filling, priming, or spraying operation on an object, such as a vehicle undergoing collision damage repair, the booth comprising a housing, air handling system, and a movable carriage carrying a tool in fluid communication with said air handling system.

According to certain illustrative embodiments, provided is a booth for performing a filling, priming, or spraying operation on an object, such as a vehicle undergoing collision damage repair, the booth comprising a housing, an air handling system for removing debris and particulate from a sealed application area located adjacent the object, and a movable carriage carrying a tool in fluid communication with said air handling system.

According to certain illustrative embodiments, provided is a booth for performing a filling, priming, or spraying operation on an object, such as a vehicle undergoing collision damage repair, the booth comprising a housing, a first air handling system for removing debris and particulate from the housing, second air handling system for removing debris and particulate from a sealed application area located adjacent the object, and a movable carriage carrying a tool in fluid communication with said second air handling system.

According to certain illustrative embodiments, provided is a booth for performing a filling, priming, or spraying operation on an object, such as a vehicle undergoing collision damage repair, the booth comprising a housing comprising a ceiling and at least one wall defining an area for filling, priming, and/or spraying an object, an air handling system, and a movable carriage carrying a tool in fluid communication with said air handling system.

According to certain illustrative embodiments, provided is a booth for performing a filling, priming, or spraying operation on an object, such as a vehicle undergoing collision damage repair, the booth comprising a housing comprising a ceiling and at least one wall defining an area for filling, priming, and/or spraying an object, an air handling system for removing debris and particulate from a sealed application area located the object, and a movable carriage carrying a tool in fluid communication with said air handling system.

According to certain illustrative embodiments, provided is a booth for performing a filling, priming, or spraying operation on an object, such as a vehicle undergoing collision damage repair, the booth comprising a housing comprising a ceiling and at least one wall defining an area for filling, priming, and/or spraying an object, a first air handling system for removing debris and particulate from the housing, second air handling system for removing debris and particulate from a sealed application area located the object, and a movable carriage carrying a tool in fluid communication with said second air handling system.

DETAILED DESCRIPTION

Figure 1:
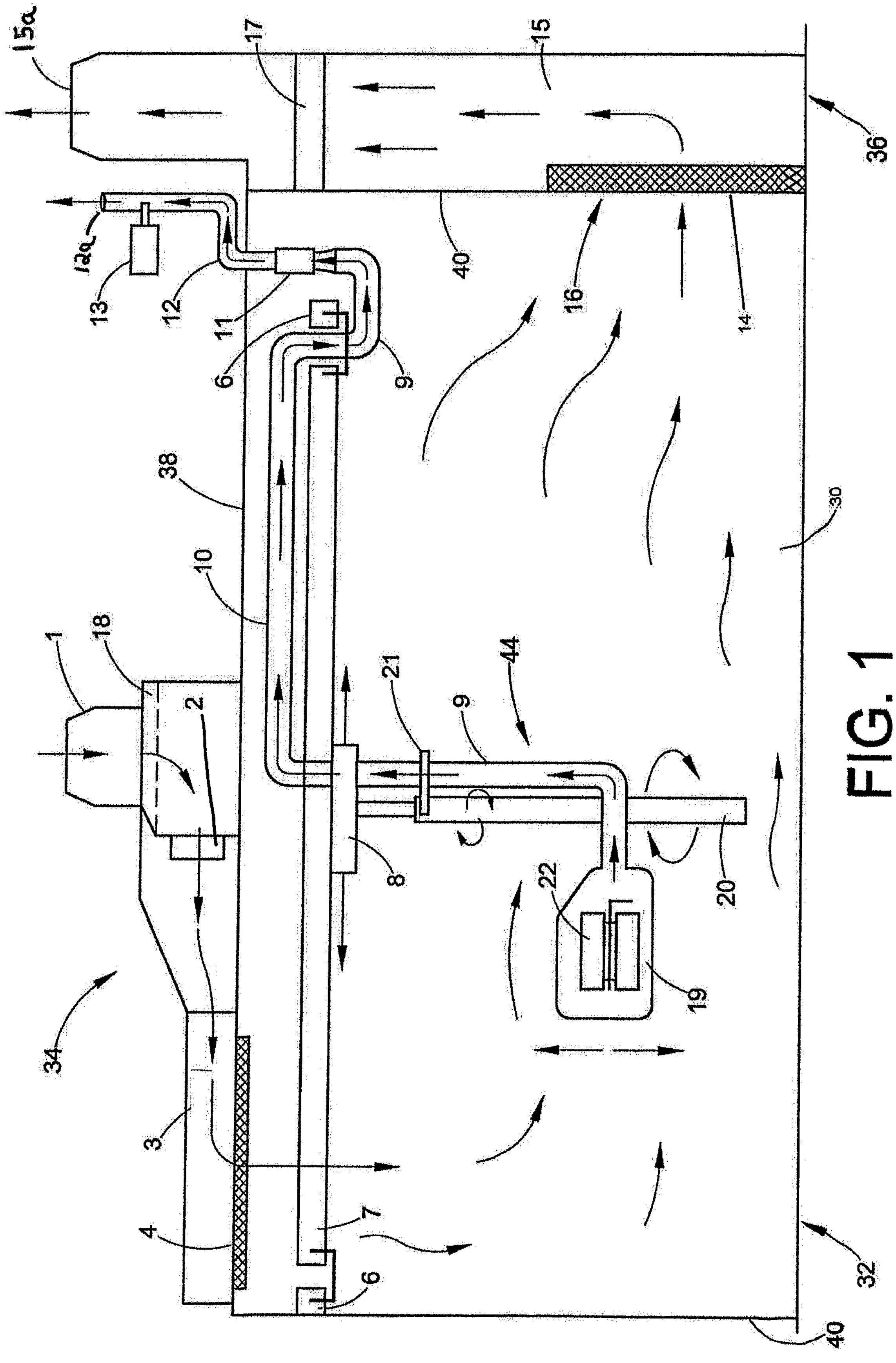
FIG. 1 is an elevation view of an illustrative embodiment of the vehicle collision repair booth.

Provided is a booth for performing at least one operation, such as performing a filling, priming, and/or painting operation on a damaged vehicle undergoing an overall vehicle collision repair process.

The paint booth provides a generally contained area in which to conduct such operations on a damaged vehicle. The housing effectively contains the particulate generated by the one or more operations conducted within the housing, and simplifies its capture, removal, and/or elimination. Painting or preparation operations may include, but are not limited to, painting, priming, or filling operations. The debris generated by such operations may include, but is not limited to, paint overspray, paint drippings, paint chips, paint dust, primer overspray, primer drippings, primer chips, primer dust, and filler dust. The booth is capable of treating air entering the booth and treating air exiting the booth, thereby providing air suitable for use in the spraying processes and removing debris from the booth attributable to primer, filler compositions, and/or paint.

The booth comprises a housing, a first air handling system, a tool for use in extracting debris or particulate generated by a filling, priming, or spraying process, and a second air handling system. The housing may comprise a closed ceiling and at least one side wall defining an area for locating a vehicle undergoing a vehicle collision repair operation. According to other embodiments, the housing may comprise an open top and at least one side wall defining an area for locating a vehicle undergoing a vehicle collision repair operation.

According to certain embodiments, the walls of the booth may comprise distinct rigid wall panels that are joined in some manner to define the area for locating the vehicle undergoing a vehicle collision repair operation, such as a spray painting operation. The bottoms of the walls may include seals to affect a positive seal between the walls of the housing of the booth and the upper surfaces of the floor that come into contact with the bottoms of the walls of the booth. Alternatively, the side walls of the housing may comprise one or more curtains that are hung from the ceiling of the housing to define an area for performing the vehicle collision repair operation.

The first air handling system is in fluid communication with the ambient environment outside of the housing and the interior of the housing. The first air handling system is capable of circulating air from the ambient environment into the interior volume of the housing, drawing that air across and past the vehicle undergoing a vehicle collision repair operation, and circulating or otherwise exhausting the air from the interior volume back to the ambient environment outside of the housing. The circulating air is capable of conveying particulate material generated during the painting process, or any process is preparation for the painting process, from the interior volume of the booth housing.

The first air handling system comprises a device to create air flow and a device to remove particulate material from the intake air. According to certain embodiments, the first air handling system includes comprises air intake duct for receiving air from the outside ambient environment. The intake air is drawn into the air handling system by the device to create air flow, such a fan or blower, which is in fluid communication with the air intake duct. The fan may be at least partially located within a plenum that is in fluid communication with the air intake duct. Once the intake air enters the first air handling system through the air intake duct and passes through the plenum, it further passes through a filter medium that is in communication with the plenum to filter out particulate from the intake air.

The first air handling system also includes an air extraction duct that is located near the opposite side of the spray booth housing from the air intake. An air extraction means, such as fan or blower, is at least partially located within the air extraction duct to draw exhaust air into the extraction duct. A filter medium is located in fluid communication with the extraction duct to filter out particulate generated in the spray booth housing from the spraying process.

The booth also includes a tool in fluid communication with a second air handling system for removing debris and particulate from a sealed application area located adjacent the vehicle undergoing a vehicle collision repair operation. The tool may be used during a spraying process or a process that precedes a spraying process. The tool in fluid communication with a second air handling system is capable of drawing air from end tool and exhausting the air drawn from the tool to the outside ambient environment. According to certain embodiments, the second air handling system may comprise a movable air intake conduit that is engaged with and is in fluid communication with the end tool, a static air conduit, a device to create air flow, and an exhaust duct. According to certain embodiments, the movable air intake of the second air handling system includes flexible conduit, such as a flexible hose or tubing, that is in communication with the end tool and a static duct that is in communication with the flexible hose.

A portion of the tool and second air handling system are carried by a sledge. The tool and flexible tubing are movably engaged with the sledge by a mounting that is engaged with the sledge. In turn, the sledge may be engaged with a movable carriage. The carriage is movably engaged with an elongated rail system. The sledge permits the tool and portions of the second air handling system to move from the front to the rear of the booth. The elongated rail permits the carriage to move side to side within the housing. Additionally, the end tool and flexible conduit portion of the second air handling system are movable up and down along the elongated mounting and capable of rotating 360 degrees about the mounting.

Illustrative embodiments of the booth will now be described in greater detail with reference to the FIGURES, which illustrate a vehicle collision repair booth. It should be noted that the vehicle collision repair booth and methods of using the vehicle collision repair are not intended to be limited to the illustrative embodiments shown in the FIGURES.

Figure 2:
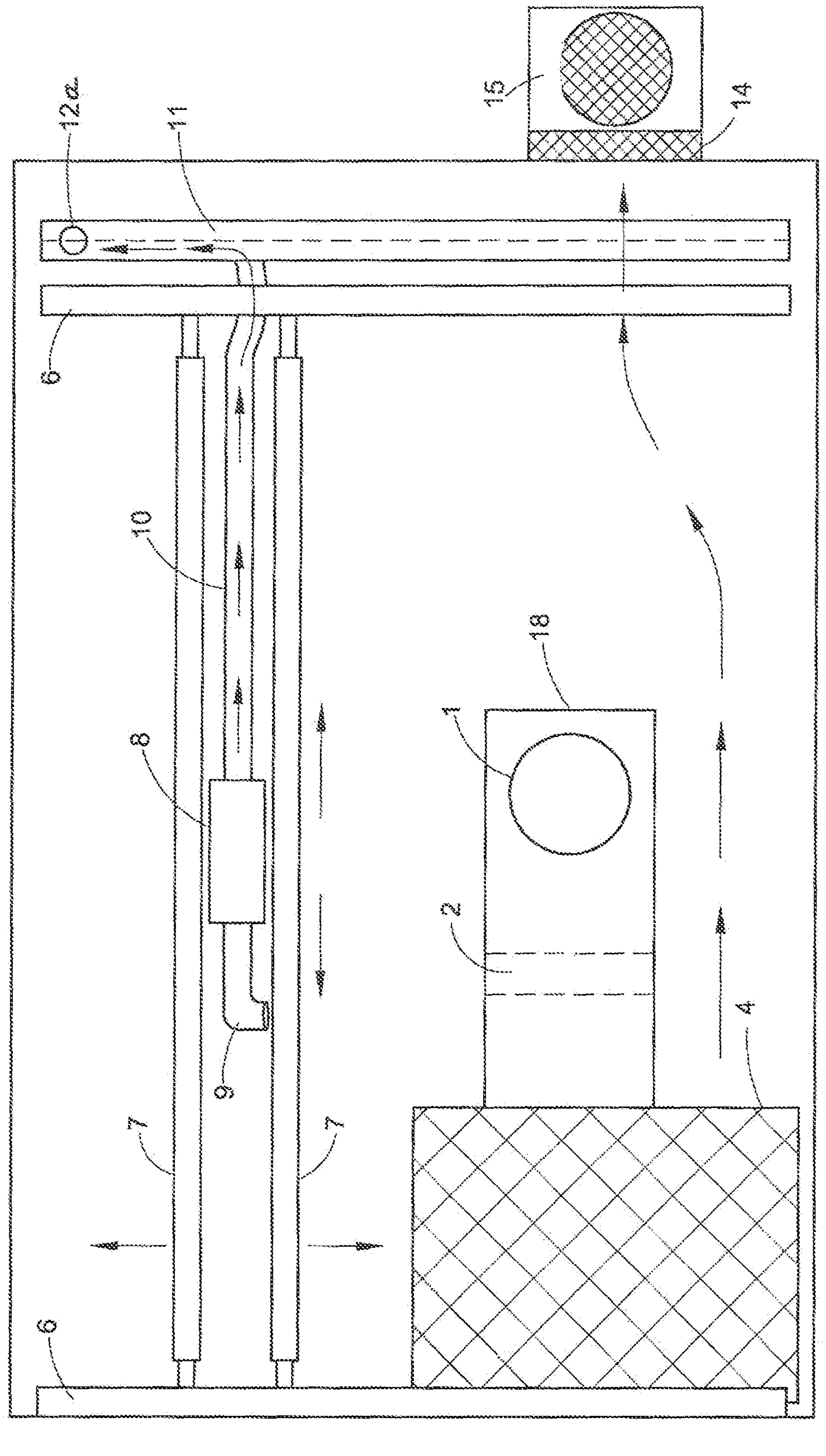
FIG. 2 is a plan view of an illustrative embodiment of the vehicle collision repair booth.

Referring to FIGS. 1 and 2, provided is a booth or cabin 30. The booth 30 comprises a housing 32, a first air handling system 34, a tool 19, and a second air handling system 44.

The housing 32 generally includes a ceiling 38 and at least one wall 40 (the front and rear walls of booth 30 are both designated by reference numeral 40) for providing an area to locate the vehicle undergoing a vehicle collision repair operation and to contain overspray and other debris from repair operations, such as spraying processes. Housing 32 can be of any size and shape suitable to contain the desired portion of the vehicle to be sprayed. In certain embodiments the housing 32 will be capable of containing the entire vehicle to be sprayed. The housing 32 structure may be rigid or flexible. The housing 32 may comprise one or more openings 42 to permit fluid or other communication between the ambient environment and the interior volume of the housing 32. Opening 42 in the housing 32 may comprise doors, gates, louvers, air flow devices, or other devices to control fluid or other communication between the ambient environment and the interior volume. Opening 42 in the housing 32 may be used to insert a vehicle into the interior volume, to remove a vehicle from the interior volume, to permit air flow from the ambient environment to the interior volume, to permit air flow from the interior volume to the ambient environment, to permit other communication, or some combination thereof.

A first air handling system 34 is in fluid communication with the ambient environment and the interior volume of the housing 32. The first air handling system 34 includes means for drawing air into the housing 32 and means for exhausting air from the housing 32. The first air handling system 34 is thus capable of drawing air from the ambient environment into the interior volume of the housing 32 and exhausting air from the interior volume to the ambient environment. The first air handling system 34 may comprise a fan, blower, compressor, or other similar device to create circulating air flow. According to certain embodiments, the first air handling system 34 comprises a fan 18 that is in fluid connection with an air intake duct or opening 1 in the housing 32 which permits fluid communication between the ambient environment and the interior volume of the housing 32. According to such embodiments, the fan 18 can promote flow of fluids, such as air, through the opening 1. Without limitation, the fan 18 may be directly connected to the opening 1 or it may be connected to the opening 1 by means of a duct, tube, hose, pipe, or other fluid conduit.

According to certain embodiments, a fluid connection between the fan 18 and the opening 1 with which it is connected comprises a flow modifier such as, without limitation, a plenum chamber. Other components which can affect the temperature, speed, pressure, humidity, or other property of the air flow, such as a venturi, a heater, a cooler, a humidifier, a de-humidifier, may be included in the first air handling systems 34. In the illustrative embodiment shown in FIGS. 1 and 2, the first air handling system 34 includes a heater 2 to heat the air and a plenum 3 to modify flow of air to the housing 32.

The first air handling system 34 may also comprise a filter 4 for filtering debris from the intake air. The filter 4 may comprise a dry filter, wet filter, precipitator, catalyst, or other device to remove debris from the intake air. In certain embodiments, the first air handling system 34 comprises a filter 4 that is in fluid connection to the air intake duct or opening 1 in the housing 32 which permits fluid communication between the ambient environment and the interior volume of the housing 32 but resists the passage of debris. The manner in which the filter 4 will remove debris from the circulating air depends upon the type of filter 4. Without limitation, in certain embodiments, the filter 4 is a dry filter which allows passage of circulating air but which captures debris consisting of particles larger than the dry filter pass size. Handling of air through the booth 30 creates an air flow which picks up debris and conveys the debris along with the air flow. By transporting the circulating air flow through a filter 4, the transported debris is handled by the filter 4. According to the illustrative embodiment shown, filter 4 is in fluid communication with the opening 1 via plenum 3. The first air handling system 34 includes means 36 for exhausting circulating air from the interior housing 32 of the booth 30. The air circulating within the interior volume of the housing 32 passes through filter 14 in order to filter out particulate debris generated from the filling, priming, and/or painting process, and then passes into air exhaust or extract duct 15. The air is drawn through filter 14 and into duct 15 by means of a fan 17 that is positioned with at least a portion of duct 15. The air that is drawn in duct 15 exits the booth 30 through exhaust opening 15*a*.

The booth 30 further includes an end tool 19 for use in a painting operation or a preparation operation prior to painting. In certain embodiments, the end tool 19 comprises a shroud or hood or similar barrier to isolate or mask a desired region or area adjacent the surface of the vehicle undergoing a vehicle collision repair operation. In certain embodiments in which the end tool 19 comprises a hood, the hood will comprise an enclosure with an open face. In embodiments in which the end tool 19 comprises a hood with an open face, the open face of the hood may be placed into contact with a surface on the vehicle such that the surface of the vehicle acts to close the hood and define a closed work space within the hood. In certain embodiments in which the end tool 19 comprises a hood with an open face, the hood will be connected to a second air handling system 44.

The second air handling system 44 is capable of drawing air from the end tool 19 and exhausting the air from the housing 32 of the booth. The second air handling system 44 comprises an air intake 9 engaged with the end tool 19, static ducts 10, 11, means to create the flow of air 13, and an air output or exhaust duct 12. The means 13 to create air flow may be a fan, blower, or any type of device usable to create air flow. The air intake 9 is in fluid communication with the tool 19, fan 13 and exhaust duct 12. The air intake 9 may be directly connected to the fan 13 or the air intake 9 may be connected to the fan 13 by way of a duct, tube, hose, pipe, or other fluid conduit 10, 11. The air output 12 is in fluid communication with the fan 13. The air output 12 may be directly connected to the fan 13 or the air output 12 may be connected to the fan 13 by way of a duct, tube, hose, pipe, or other fluid conduit. In certain embodiments the secondary air handling system 44 comprises a dry filter, wet filter, precipitator, catalyst or other device to remove debris from the air therein.

In certain embodiments, the air output 12 is fixed with respect to the housing 32. In such embodiments, the air intake 9 will be movable with respect to the fixed air output 12. In embodiments in which the air intake 9 will be movable with respect to the fixed air output 12, fluid conduits having end portions movable with respect to one another while still maintaining integrity may be used to provide fluid communication between the air intake 9 and the air output 12. Fluid conduits having end portions movable with respect to one another while still maintaining integrity include, without limitation, hoses. In certain embodiments, the air output 12 is in fluid communication with the ambient environment via an air output opening 12*a*.

By connecting the second air handling system 44 to the tool 19 in such a manner as to permit the second air handling system 44 to withdraw draw air from the tool 19, the tool 19 may be made into a region of lower pressure. By connecting the second air handling system 44 to the hood of the tool 19 in such a manner as to permit the second air handling system 44 to withdraw draw air from the hood of the tool 19, air flow is established within the hood.

In embodiments in which the hood comprises an open face and in which an open face of the hood is placed across a surface on a vehicle such that the surface of the vehicle acts to close the hood and define a closed work space within the hood, making the hood into a region of lower pressure promotes a seal between the hood of the tool 19 and the vehicle. This seal aids in isolation of the hooded surface and confinement of debris resulting from work performed within the hood. In certain embodiments a hood of the tool 19 will comprise isolation gloves or other manipulators that allow a user to work upon a hooded region of a vehicle through the hood 19 while still maintaining a seal.

In certain embodiments, the tool 19 may be engaged to the vertically positioned mounting 20 or retaining element 21 which allows rotation of the end tool 19 about one or more of the three spatial dimensions. The tool 19 may translate up and down along the length of the mounting 20. Additionally, the tool 19 may rotate 360° about mounting 20. In certain embodiments, the mounting 20 and the element 21 allow placement of the end tool 19 at a desired position and orientation.

In certain embodiments, the end tool 19 comprises a drying unit 22. A drying unit 22 may comprise a fan, or blower, or compressor, or other device to create air flow. A drying unit 22 may comprise a heater or a de-humidifier, or both. In certain embodiments, the end tool 19 will comprise a drying unit 22 within the hood.

Debris generated within the hood may be picked up by air flow within the tool 19 created by the secondary air handling system 44. This air flow can conveys the debris along with the air flow through the secondary air handling system 44. The debris travels through flexible and movable intake conduit 9, through static conduits or ducts 10, 11 and is exhausted to the environment through duct 12. In certain embodiments, debris transported by the secondary air handling system 44 may be processed by filters (a dry filter, wet filter, precipitator, or catalyst) within the secondary air handling system 44 or the debris can be injected into the primary air handling system 34 for removal.

Tool 19 is movably mounted within housing 32 of the booth to enable efficiently prepping and painting of a vehicle. The tool 19 is engaged with sledge 8 by the mounting 20. Tool 19 is therefore carried or otherwise supported by the mounting 20 and sledge 8. Retaining member 21, such as a retaining bracket, is used to affix flexible air intake hose 9 to mounting element 20. The sledge 8 is engaged with a movable carriage system 7. The carriage 7 is movably engaged with a set of spaced apart elongated rails 6. The rails 6 are spaced apart from one another and between them define a first guideway, a surface in space, along which a component movably engaged to the rails 6 may travel. In certain embodiments, there are two rails 6 which are substantially straight elongated members mounted in parallel to one another which define a planar surface between them and along which movably engaged components may travel. In other embodiments, there may be more than two rails, the rails may be non-linear, or non-parallel, or both, such that the first guideway is a complex surface. The carriage 7 is movably engaged to at least two rails 6 and is free to move along the first guideway defined by the rails. In certain embodiments, the carriage 7 is engaged with the rails 6 by means of wheels or rollers or bearings or the like. In certain embodiments the carriage is engaged to the rails 6 by slider bearings or linear bearings or the like. The carriage 7 comprises a pair of spaced apart elongated members defining a second guideway between the rails 6 along which a component movably engaged to the carriage 7 may travel. Thus, the elongated rail set 6 permits the carriage 7 to move side to side within the housing 32. The extraction conduit 11 is affixed to the carriage 7 via duct 10 so when the carriage system 7 moves the entire second air handling system 44 moves and stays together.

Sledge 8 may be movably engaged to the carriage 7. The sledge 8 can move along the second guideway defined by the carriage 7. Because the carriage 7 can, in turn, move along the first guideway defined by the rails 6, by moving the carriage 7 along the rails 6 and the sledge 8 along the carriage 7, it is possible to place the sledge 8 at a desired position along the surface in space defined by the rails 6. The sledge 8 permits the tool 19 to move from front to rear within the housing 32. The sledge also conveys a vertical retaining element 20. The vertical retaining element 20 may be any element that can engage tool 19 in the vertical direction. Tool 19 is movable up and down along the entire length of the mounting element 20 and is capable of rotating 360 degrees about mounting element 20. The vertical mounting element 20 also provides a third degree of freedom. Collectively, the rails 6, carriage 7, sledge 8, and vertical retaining element 20 allow the desired placement of tool 19 near a vehicle positioned in housing 32 undergoing a vehicle collision repair operation.

The degrees of freedom provided by the rails 6, carriage 7, sledge 8, and mounting element 20 may include all three position dimensions, all three rotational dimensions, or any subset of these dimensions. In certain embodiments, all of these degrees of freedom are provided and the tool 19 can be located at any position and at any orientation within the housing 32.

While the vehicle collision repair booth has been described in connection with various embodiments, as shown in the various figures, it is to be understood that other similar embodiments may be used or modifications and additions may be made to the described embodiments for performing the same function without deviating therefrom. Furthermore, the various illustrative embodiments may be combined to produce the desired results. Therefore, the spray booth should not be limited to any single embodiment, but rather construed in breadth and scope in accordance with the recitation of the appended claims.

The invention claimed is:

1. A vehicle collision repair booth comprising: a housing;

a first air handling system for drawing air from the ambient environment outside of said housing into an interior volume of said housing, drawing the air across and past a vehicle undergoing collision repair, and exhausting the air from said interior volume of said housing to the ambient environment outside of said housing;

a second air handling system in fluid communication with a movable tool for drawing air from said interior volume of said housing into the movable tool and exhausting air from said interior volume of said housing to the ambient environment outside of said housing, through an air exhaust duct fixed to the housing, wherein said movable tool includes a hood and a drying unit;

a pair of spaced apart elongated rails defining a first guideway for the movement of an overhead carriage from side to side within the housing;

said overhead carriage movably engaged with the pair of spaced apart elongated rails, the overhead carriage comprising a pair of spaced apart elongated rail members defining a second guideway for the movement of a sledge from the front to the rear of the housing;

said sledge movably engaged with the overhead carriage;

wherein said second air handling system comprises a flexible and movable air intake conduit extending vertically downwardly from the sledge and in fluid communication with said movable tool, a first exhaust conduit in fluid communication with the flexible and movable air intake conduit and extending upwardly from the sledge, a second exhaust conduit in fluid communication with said first exhaust conduit and with said air exhaust duct;

wherein the first exhaust conduit is movable with the overhead carriage;

wherein the second exhaust conduit is static and is affixed to the overhead carriage by the first exhaust conduit;

wherein said movable tool is engaged with said sledge by an elongated mounting, wherein said mounting extends vertically downwardly from said sledge and is positioned entirely downwardly from said sledge, and wherein said flexible and movable air intake conduit and movable tool are movable up and down along the length of said elongated mounting and rotating 360 degrees about said elongated mounting.

2. The vehicle collision repair booth of claim 1, wherein said housing comprises a ceiling and at least one rigid wall defining an area for spraying an object, and wherein said first air handling system comprises an air intake duct in the ceiling of the housing.

3. The vehicle collision repair booth of claim 2, further comprising a fan in fluid communication with said air intake duct and a plenum in fluid communication with said fan.

4. The vehicle collision repair booth of claim 3, wherein said first air handling system further comprises a filter in fluid communication with an air exhaust duct.

5. The vehicle collision repair booth of claim 1, wherein the overhead carriage is movably engaged with a pair of elongated rails spaced-apart in the same horizontal plane.

6. The vehicle collision repair booth of claim 1, wherein said drying unit comprises a heater.

7. The vehicle collision repair booth of claim 6, wherein said heater is located within said hood.

* * * * *